US008644792B2

(12) United States Patent
Lontka

(10) Patent No.: US 8,644,792 B2
(45) Date of Patent: Feb. 4, 2014

(54) EMERGENCY DISPLAY FOR EMERGENCY PERSONNEL

(75) Inventor: Karen D. Lontka, Randolph, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 1044 days.

(21) Appl. No.: 12/107,412

(22) Filed: Apr. 22, 2008

(65) Prior Publication Data

US 2009/0042533 A1 Feb. 12, 2009

Related U.S. Application Data

(60) Provisional application No. 60/914,510, filed on Apr. 27, 2007, provisional application No. 60/913,320, filed on Apr. 23, 2007.

(51) Int. Cl.
*H04M 11/04* (2006.01)

(52) U.S. Cl.
USPC .................... 455/404.1; 455/553.1; 455/420; 455/418; 455/419; 340/540; 340/506; 340/521; 340/539; 340/531

(58) Field of Classification Search
USPC ................... 455/404.1, 553.1; 340/540, 506, 340/539.16, 521, 539.1
See application file for complete search history.

(56) References Cited

U.S. PATENT DOCUMENTS

| | | | | |
|---|---|---|---|---|
| 3,923,370 | A | 12/1975 | Mostrom | |
| 5,113,177 | A | 5/1992 | Cohen | |
| 7,301,455 | B2 * | 11/2007 | McKenna et al. | 340/540 |
| 7,369,174 | B2 * | 5/2008 | Olita et al. | 348/373 |
| 7,733,224 | B2 * | 6/2010 | Tran | 340/540 |
| 2002/0039085 | A1 | 4/2002 | Ebersole et al. | |
| 2003/0234725 | A1 * | 12/2003 | Lemelson et al. | 340/521 |
| 2006/0109113 | A1 | 5/2006 | Reyes et al. | |
| 2006/0208888 | A1 | 9/2006 | Patel et al. | |

FOREIGN PATENT DOCUMENTS

| | | | |
|---|---|---|---|
| CA | 2606401 | A1 | 3/2007 |
| WO | 2006053185 | A2 | 5/2006 |

OTHER PUBLICATIONS

International Search Report dated Sep. 10, 2008 for Application No. PCT/US2007/077102.

Office Action dated Mar. 29, 2012, from Canadian Patent Office for related application.

* cited by examiner

*Primary Examiner* — Kiet Doan
*Assistant Examiner* — Michael T Vu

(57) ABSTRACT

An emergency device or emergency system is configured for operation within a fire safety system, or a fire safety portion of a building automation system (BAS). For example, wireless devices, emergency devices and/or automation components within the fire safety system, or the fire safety portion of the BAS may be configured to automatically provide or otherwise communicate emergency information to an emergency device or system. The emergency information may, in turn, be utilized by emergency personnel or first responders to determine conditions with the structure. A heads-up display is configured to present the display data based on the received emergency communication to a user.

16 Claims, 7 Drawing Sheets

EMERGENCY DISPLAY FOR EMERGENCY PERSONNEL

CROSS-REFERENCE TO RELATED APPLICATIONS

This patent claims the priority benefit under 35 U.S.C. §119(e) of U.S. provisional patent application Ser. No. 60/914,510 (2007P08785US), filed on Apr. 27, 2007; and U.S. provisional patent application Ser. No. 60/913,320 (2007P08407US), filed on Apr. 23, 2007 the contents of which are hereby incorporated by reference for all purposes.

This patent relates to co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

BACKGROUND

The present disclosure generally relates fire safety devices and systems for use within and in cooperation with a building automation system. In particular, the present disclosure relates to a display and device for use by emergency personnel during emergency situations.

A building automations system (BAS) typically integrates and controls elements and services within a structure such as fire systems, security services and the heating, ventilation and air conditioning (HVAC) systems. The integrated and controlled systems are arranged and organized into one or more field level networks (FLNs) containing application or process specific controllers, sensors, actuators, or other devices distributed or wired to form a network. The field level networks provide general control for a particular floor, region or zone of the structure. For example, a field level network may be an RS-485 compatible network that includes one or more controllers or application specific controllers configured to control the elements or services within floor or region. The controllers may, in turn, be configured to receive an input from a sensor or other device such as, for example, a room temperature sensor (RTS), an oxygen level, an air quality sensor, a smoke detector and other fire detection elements deployed to monitor the floor, region or zone. The input, reading or signal provided to the controller, in this example, may be a temperature indication representative of the physical temperature. The temperature indication may be utilized to signal the presence or occurrence of a fire within a given floor, region or zone of the structure. Alternatively, a smoke detector deployed within the structure may be utilized to directly signal the presence or occurrence of a fire.

Information such as the temperature indication, sensor readings and/or actuator positions provided to one or more controllers operating within a given field level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included field level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a field level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

SUMMARY

The present disclosure generally provides for an emergency device or emergency system configured for operation within a fire safety system, or a fire safety portion of a building automation system (BAS). For example, wireless devices, emergency devices and/or automation components within the fire safety system, or the fire safety portion of the BAS may be configured to automatically provide or otherwise communicate emergency information to an emergency device or system. The emergency information may, in turn, be utilized by emergency personnel or first responders to determine conditions with the structure. A heads-up display is configured to present the display data based on the received emergency communication to a user.

In one exemplary embodiment, an emergency display device configured for operation within a building automation system is provided. A processor is in communication with a wireless communications component and a memory. The processor is configured to execute computer readable instructions stored on the memory. The instructions include evaluating an emergency communication received via the wireless communications component from an emergency display device deployed within a structure, and generating display data based on the received emergency communication. A heads-up display is configured to present the display data to a user.

In another exemplary embodiment, an emergency display system is provided. An emergency device has a wireless communication component. The emergency device configured to generate an emergency communication, wherein the emergency communication is related to a structure and communicate the emergency communication via the wireless communication component. A heads-up display device is in communication with, at least, the emergency device. The heads-up display device is configured to process an emergency communication received via the wireless communications component, wherein the emergency communication is provided by an automation component, generate display data based on the received emergency communication, and present the display data to a user.

In yet another exemplary embodiment, an emergency display device configured for operation within a building automation system is provided. A display projector is in communication with a processor and a wireless communications component. The wireless communications component is configured to receive an emergency communication from an emergency display device deployed within a structure. A heads-up display is configured to display location information contained within the received emergency communication.

Additional features and advantages of the present invention are described in, and will be apparent from, the following Detailed Description and the figures.

BRIEF DESCRIPTION OF THE FIGURES

The method, system and teaching provided relate to emergency devices and systems operating within a building automation system (BAS).

DETAILED DESCRIPTION

Figure 1:
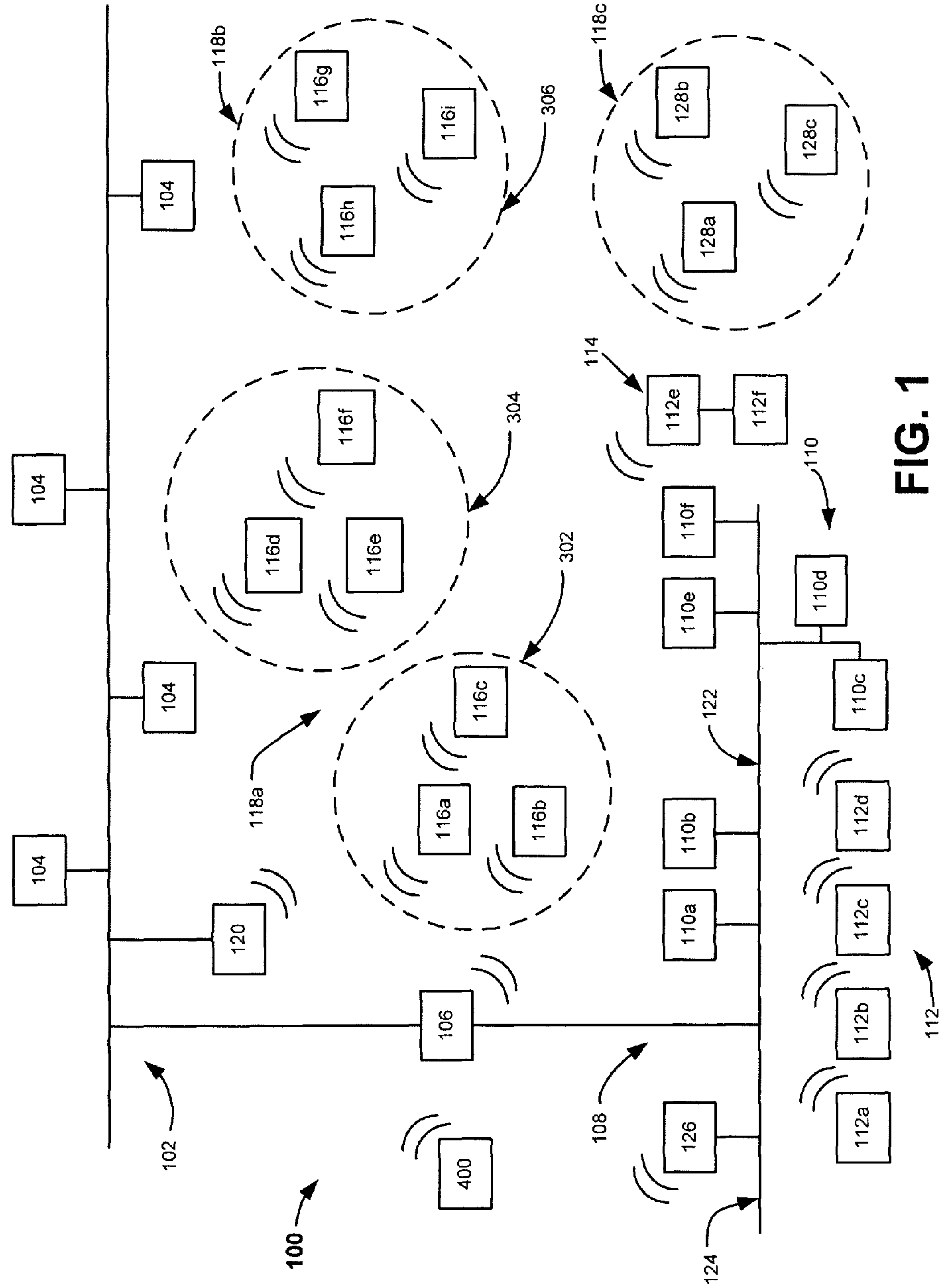
FIG. 1 illustrates an embodiment of a building automation system configured in accordance with the disclosure provided herein.

The embodiments discussed herein include automation components, wireless communication components and/or transceivers which may be configured and utilized in connection with an emergency system deployed within or communicatively connected to a fire safety system, or a fire safety portion of a building automation system (BAS). The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as examples of emergency devices, automation components, wireless devices and transceivers that may be integrated and utilized within an emergency system operable with the BAS. Moreover, the emergency devices and automation components operable within the BAS and emergency system include separate wireless communication components and transceivers, however it will be understood that that the wireless communication component and transceiver may be integrated into a single automation component operable within the building automation system.

One exemplary fire safety system may include or cooperate with the devices and be configured as described above is the Siemens XLS, MXL and FS250 systems provided by Siemens Building Technologies, Inc. One exemplary BAS that may include the devices and be configured as described above and may cooperate with the fire safety system is the APOGEE® system provided by Siemens Building Technologies, Inc. The APOGEE® system may implement: (1) known wired communication standards such as, for example, RS-485 wired communications, Ethernet, proprietary and standard protocols, as well as (2) known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ11 or other type of connector, an RJ-45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) or any other communication protocol. These exemplary wired, wireless devices may further include a man-machine interface (MMI) such as a web-based interface screen that provide access to configurable properties of the device and allow the user to establish or troubleshoot communications between other devices and elements of the BAS.

FIG. 1 illustrates an exemplary fire safety system deployed in cooperation with a building automation system or control system 100. The fire safety system may be independent of the control system 100 or may be a subsystem thereof including emergency devices 128*a* to 128*c*. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a field level network (FLN). The first network 102 may be wired or wirelessly coupled or in communication with the second network 108. The second network 108, in this exemplary embodiment, may include a first wired network portion 122 and a second wired network portion 124 that connect to building automation components 110 (individually identified as automation components 110*a* to 110*f*). The second wired network portion 124 may be coupled to wireless building automation components 112 via the automation component 126. The automation component 126 may be a field panel, FPX or another full function device. For example, the building automation components 112 may include wireless devices individually identified as automation components 112*a* to 112*f*. In one embodiment, the automation component 112*f* may be a wired device that may or may not include wireless functionality and connects to the automation component 112*e*. In this configuration, the automation component 112*f* may utilize or share the wireless functionality provided by the automation component 112*e* to define an interconnected wireless node 114. The automation components 112*a* to 112*f* may, in turn, communicate or connect to the first network 102 via, for example, the controller 106 and/or an automation component 126.

The control system 100 may further include automation components 116 which may be individually identified by the reference numerals 116*a* to 116*i*. The automation components 116*a* to 116*i* may be configured or arranged to establish one or more mesh networks or subnets 118*a* and 118*b*. The automation components 116*a* to 116*i* such as, for example, full or reduced function devices and/or a configurable terminal equipment controller (TEC), cooperate to wirelessly communicate information between the first network 102, the control system 100 and other devices within the mesh networks or subnets 118*a* and 118*b*. The fire safety system and/or the control system 100 may further include emergency devices 128*a* to 128*c* configured or arranged to establish a mesh network or subnet 118*c*. For example, the emergency devices 128*a* to 128*c* may be smoke detectors configured to alert the fire safety system and/or the control system 100 in the event that smoke or a degradation of air quality is detected. Alternatively, or in addition to, the automation component 116*a* may communicate with other automation components 116*b* to 116*f* within the mesh network 118*a* by sending a message addressed to the network identifier, alias and/or media access control (MAC) address assigned to each of the interconnected automation components 116*a* to 116*f* and/or to a field panel 120. In one configuration, the individual automation components 116*a* to 116*f* within the subnet 118*a* may communicate directly with the field panel 120 or, alternatively, the individual automation components 116*a* to 116*f* may be configured in a hierarchal manner such that only one of the components for example, automation component 116*a*, communicates with the field panel 120. The automation components 116*g* to 116*i* of the mesh network 118*b* may, in turn, communicate with the individual automation components 116*a* to 116*f* of the mesh network 118*a* or the field panel 120.

The automation components 112*e* and 112*f* defining the wireless node 114 may wirelessly communicate with the second network 108, and the automation components 116*g* to 116*i* of the mesh network 118*b* to facilitate communications between different elements, section and networks within the control system 100. Wireless communication between individual the automation components 112, 116 and/or the subnets 118*a*, 118*b* may be conducted in a direct or point-to-point manner, or in an indirect or routed manner through the nodes or devices comprising the nodes or networks 102, 108, 114 and 118. In an alternate embodiment, the first wired network portion 122 is not provided, and further wireless connections may be utilized.

Figure 2:
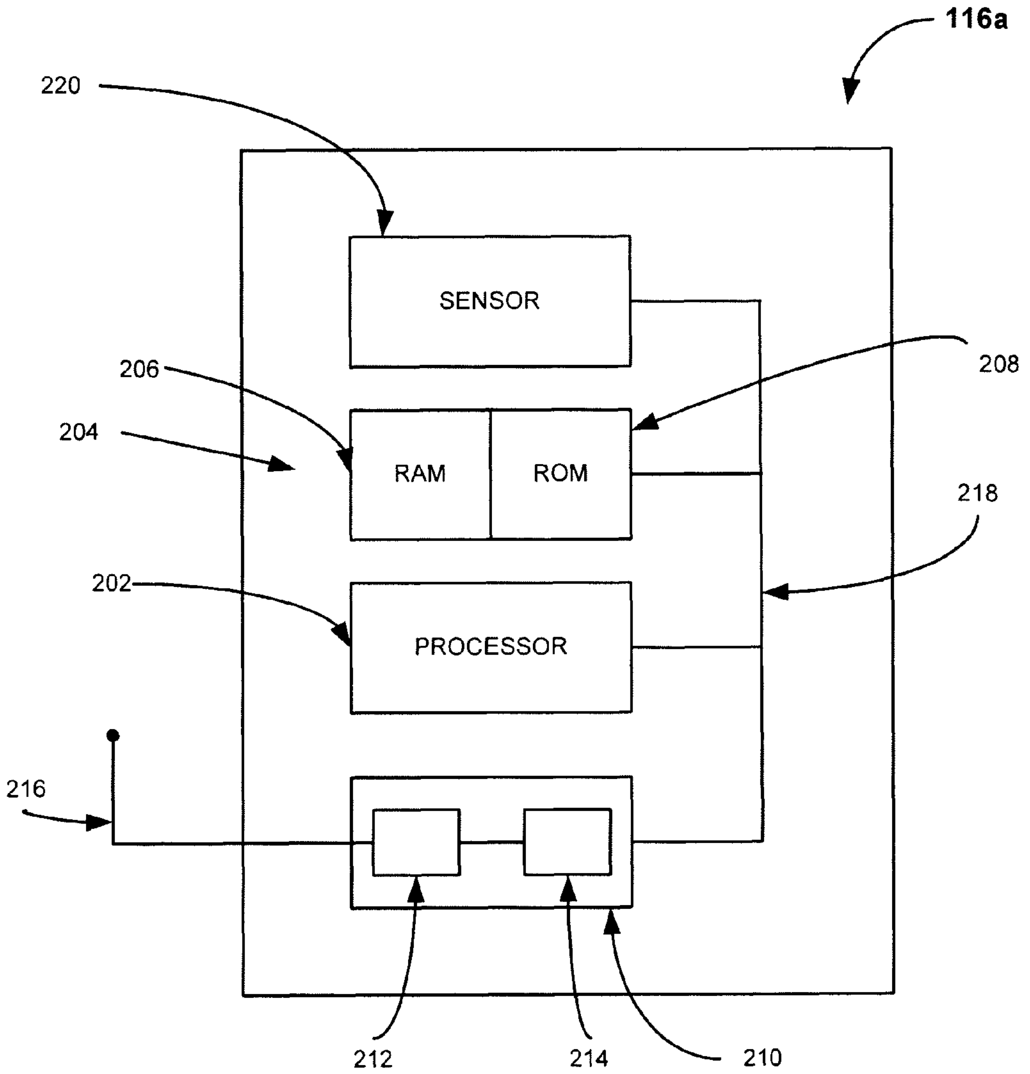
FIG. 2 illustrates an embodiment of a wireless device, emergency device and/or automation component that may be utilized in connection with the building automation system shown in FIG. 1.

FIG. 2 illustrates an exemplary detailed view of one automation component 116*a* to 116*i*. In particular, FIG. 2 illustrates the automation component 116*a*. The automation component 116*a* may be an emergency device such as a full function device or a reduced function device. While the automation component 116*a* is illustrated and discussed herein, the configuration, layout and componentry may be utilized in connection with any of the automation components deployed within the control system 100 shown and discussed in connection with FIG. 1. The automation component 116*a* in this exemplary embodiment may include a processor 202 such as an INTEL® PENTIUM, an AMD® ATHLON™ or other 8, 12, 16, 24, 32 or 64 bit classes of processors in communication with a memory 204 or storage medium. The memory 204 or storage medium may contain random access memory (RAM) 206, flashable or non-flashable read only memory (ROM) 208 and/or a hard disk drive (not shown), or any other known or contemplated storage medium or mechanism. The automation component may further include a communication component 210. The communication component 210 may include, for example, the ports, hardware and software necessary to implement wired communications with the control system 100. The communication component 210 may alternatively, or in addition to, contain a wireless transmitter 212 and a receiver 214 (or an integrated transceiver) communicatively coupled to an antenna 216 or other broadcast hardware.

The sub-components 202, 204 and 210 of the exemplary automation component 116*a* may be coupled and configured to share information with each other via a communications bus 218. In this way, computer readable instructions or code such as software or firmware may be stored on the memory 204. The processor 202 may read and execute the computer readable instructions or code via the communications bus 218. The resulting commands, requests and queries may be provided to the communication component 210 for transmission via the transmitter 212 and the antenna 216 to other automation components 200, 112 and 116 operating within the first and second networks 102 and 108. Sub-components 202 to 218 may be discrete components or may be integrated into one (1) or more integrated circuits, multi-chip modules, and or hybrids.

The exemplary automation component 116*a* may include a sensor 220 configured to detect, for example, air quality within an area of a structure, the temperature within an area of the structure, an oxygen ($O_2$) level sensor, a carbon dioxide sensor ($CO_2$), or any other desired sensing device or system. For example, the automation component 116*a* may be, in an embodiment, an WRTS configured to monitor or detect the temperature within a region or area of the structure. A temperature signal or indication representative of the detected temperature may further be generated by the WRTS and communicated by the communication component 210. In another embodiment, the automation component 116*a* may include position or location information relative to, for example, its relative and/or absolute position within the structure or an absolute position with the structure. The position or location information may be: programmed into the automation component 116*a* during deployment within the structure, determined relative to other automation components, for example, 116*b* to 116*i*, within the structure, and/or calculated via an external global positioning system (GPS), or any other known positioning system. The sensor information, position or location information, etc., may be stored within the memory 204 and communicated via the communication component 210.

Figure 3:
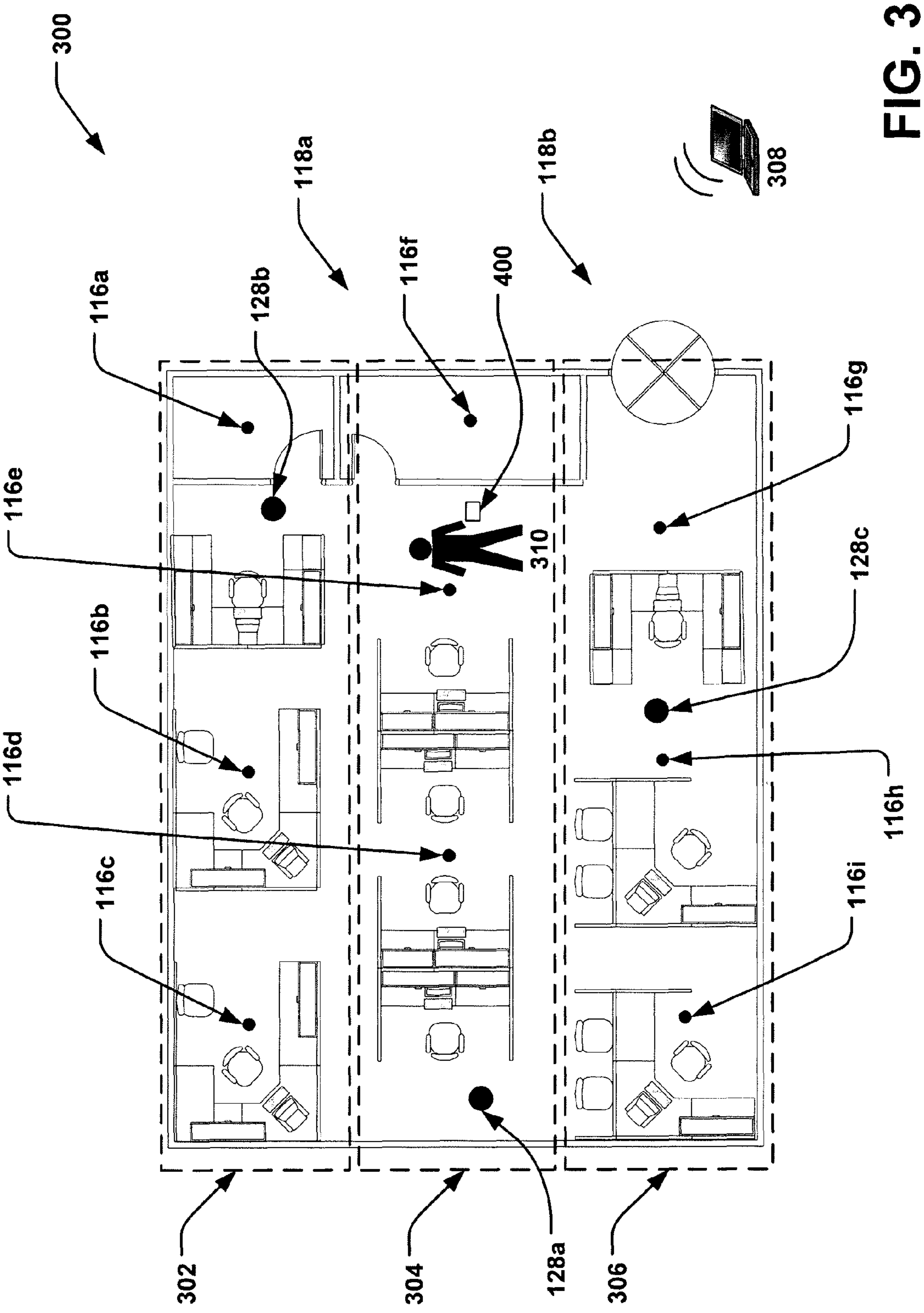
FIG. 3 illustrates an exemplary physical layout for a structure including a building automation system one or more wireless devices, emergency devices and/or automation components, subnets and zones.

FIG. 3 illustrates an exemplary physical configuration of an emergency system 300 that may include automation components 116*a* to 116*i* and which may be implemented or deploy as a part of the control system 100. For example, the emergency system 300 may be a wireless FLN, such as the second network 108, including the first and second subnets 118*a*, 118*b*. The exemplary configuration 300 illustrates a structure in which the first subnet 118*a* includes two zones 302 and 304 and the second subnet 118*b* includes the zone 306. The zones, in turn, include automation components 116*a* to 116*i*. For example, zone 302 includes automation components 116*a* to 116*c*, zone 304 includes automation components 116*d* to 116*f* and zone 306 includes automation components 116*g* to 116*i*. Zones, subnets and automation components may be deployed within the structure in any know manner or configuration to provide sensor coverage for any space of interest therein.

As previously discussed, the automation components 116*a* to 116*i* may, in operation within the control system 100, be configured to control and monitor building systems and functions such as temperature, air flow, etc. Alternatively or in addition to, one or more of the automation components 116*a* to 116*i* may be an emergency device, such as a smoked detector, configured to cooperate with the emergency system 300. In one embodiment, the emergency system 300 may be a subsystem portion of the control system 100 and may, for example, hosted or accessible via one or more of the fire panels or terminals 104 (see FIG. 1). In another embodiment, the emergency system 300 may be a system in communication with the control system 100. For example, a laptop 308 may be communicatively connected to the control system 100 and/or fire panel 104 by way of any known wired or wireless networking system or protocol. The laptop 308 may, in turn, communicate with or direct one or more of the emergency devices and/or automation components 116*a* to 116*i* to perform an emergency function.

During an emergency situation, a fire fighter 310 or other first responder may arrive at the structure illustrated in FIG. 3 to provide assistance. Depending upon the conditions, the nature of the emergency, the weather, etc., the fire fighter 310 or first responder may experience difficulty navigating the structure to locate victims and/or the source of the emergency. In this instance, the emergency system 300 may be accessed via the fire panel terminal 104 or the laptop 308 in order to provide emergency information to the fire fighter or first responder.

For example, the fire fighter 310 may carry an embodiment of a mobile emergency device 400 (see FIG. 4) when entering the structure during an emergency situation. The mobile emergency device 400 may be, for example, a cell phone, a walky-talky or any other portable electronic device configured for communication and/or information processing. The mobile emergency device 400 may, in turn, communicate with one or more of the emergency devices/automation components 116*a* to 116*i* within the structure. In particular, the mobile emergency device 400 may be configured to broadcast or transmit location information to the emergency devices 116*e*, 116*f* and 116*g*. This information may, in turn, be utilized by the mobile emergency device 400 as discussed in more detail below and/or the information may be communicated to an emergency supervisor or controller, other fire fighters, etc. to allow them to track the position of the fire fighter within the structure. As illustrated in FIG. 3, the communication with the emergency devices 116*e*, 116*f* and 116*g* may allow the position of the fire fighter 310 to be determined as zone 304.

Figure 4:
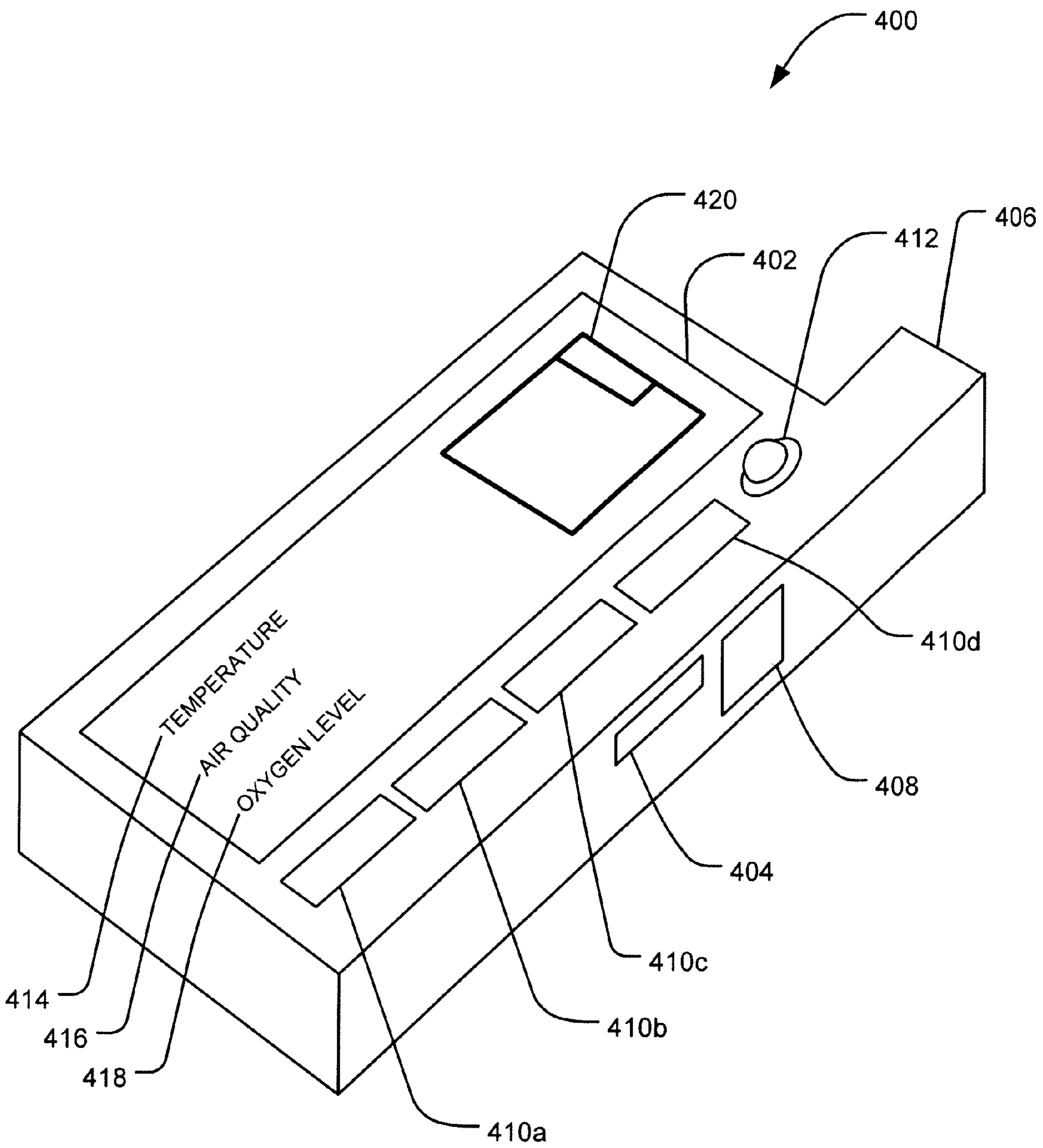
FIG. 4 illustrates an embodiment of a mobile emergency device configured in accordance with the disclosure provided herein.

FIG. 4 illustrates an exemplary embodiment of the mobile emergency device 400 that may be utilized in cooperation with the one or more of the emergency devices and/or automation components 116*a* to 116*i* and the emergency system 300. The mobile emergency device 400 may provide the fire fighter 310 or first responder a communication link or interface to the emergency system 300, the fire panel or terminal 104 and/or the laptop 308. For example, the laptop 308 may be utilized to access emergency information stored or aggregated by the terminal 104 and may, in turn, provide the aggregated information to the mobile emergency device 400.

The mobile emergency device 400 may be, for example, a personal digital assistant (PDA) or smart-phone utilizing Advanced RISC Machine (ARM) architecture or any other system architecture or configuration. The mobile emergency device 400 may utilize one or more operating systems (OS) or kernels such as, for example, PALM OS®, MICROSOFT MOBILE®, BLACKBERRY OS®, SYMBIAN OS® and/or an open LINUX™ OS. These or other well known operating systems could allow programmers to create a wide variety of programs or applications for use with the mobile emergency device 400. In another embodiment, the mobile emergency device 400 may be pendant or ankle bracelet configured to wirelessly communicate with the control system 100 to allow the position of fire fighter 310 or first responder to be tracked and monitored within the structure.

The mobile emergency device 400 may include a touch screen 402 for entering and/or viewing emergency information or data, a memory card slot 404 for data storage and memory expansion. The memory card slot 404 may further be utilized with specialized cards and plug-in devices to expand the capabilities of functionality of the mobile emergency device 400. The emergency mobile device 400 may include an antenna 406 to facility connectivity via one or more communication protocols such as: WiFi (WLAN); Bluetooth or other personal area network (PAN) standard; cellular communications and/or any other communication standard disclosed herein or known. The mobile emergency device 400 may further include an infrared (IR) port 408 for communication via the Infrared Data association (IrDA) standard. Hard keys 410*a* to 410*d* may be provided to allow direct access to predefined functions or entrance of information via a virtual keyboard provided via the touch screen 402. The number and configuration of the hard keys may be varied to provide, for example, a full QWERTY keyboard, a numeric keyboard or any other desired arrangement. The mobile emergency device 400 may further include a trackball 412, toggle or other navigation input for interaction with emergency information or data presented on the touch screen 402.

Figure 4A:
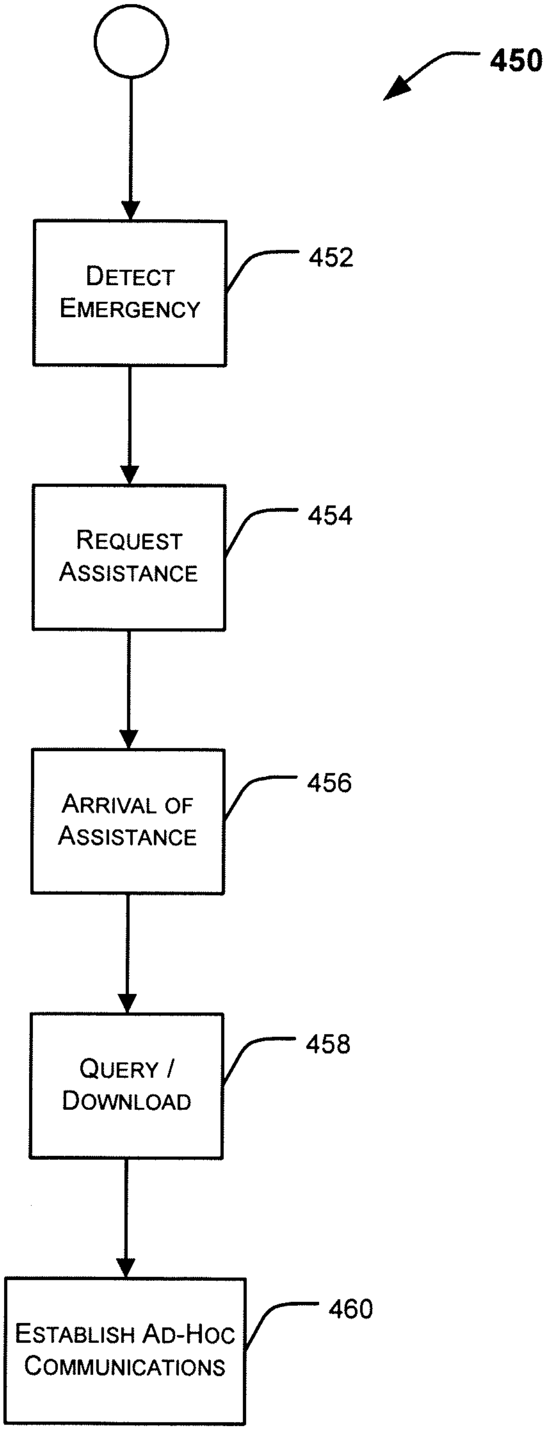
FIG. 4A is a flowchart illustrating a communication operation that may be performed by the mobile emergency device shown in FIG. 4.

FIG. 4A illustrates a flowchart 450 detailing the exemplary operation of the mobile emergency device 400 and the emergency system 300 accessible via the accessed via the fire panel or terminal 104 and/or the laptop 308.

At block 452, an emergency or emergency situation may be detected by one or more of the emergency devices or automation components 116*a* to 116*i* within the structure. The emergency situation may be the detection of dangerous carbon monoxide levels, smoke or other degradation of air quality within the structure. The detection of a fire within the structure, and/or the detection of any other emergency situation within the structure such as the status of a manual fire pull station, the status of a sprinkler system and/or other extinguisher status or states may be monitored by the control system 100 and/or the emergency system 300.

At block 454, the control system 100 and/or the emergency system 300 may request assistance from, for example, the fire department, a hazardous material team, an ambulance or any other appropriate responder.

At block 456, the fire fighter 310, emergency personnel and/or other first responders may arrive at the structure in preparation for rendering assistance. The emergency personnel may employ the laptop 308 to interface with and query the control system 100 and/or the emergency system 300. The communication between the emergency personnel and the emergency system 300 within the structure may be conducted by establishing an ad-hoc wireless network between the terminal 104 and the laptop 308. Alternatively, the laptop 308 may directly communicate with the control system 100 via a wired or wireless interface provided for the purpose. In this way, the emergency personnel can determine the severity of a problem, for example a fire within the structure, before exposing themselves to danger. In another embodiment, a structure map 420 or layout of the structure may be provided by the control system 100, the emergency system 300 and/or emergency device/automation component 116*a* to 116*i* in a neutral file format such as, for example, Drawing Interchange Format (DXF) for display on the touch screen 402. For example, the structure map 420 may be stored on an secure digital (SD) memory card, a USB drive and provided to the mobile emergency device 400 via the memory card slot 404. Alternatively, structure map 420 could be download via a wired or wireless connection established between the mobile emergency device 400 and, for example, the fire panel 104.

At block 458, the queried and downloaded information may be communicated to one or more mobile emergency devices 400. Alternatively, the previous steps may be implemented as the fire fighter 319 or other emergency personnel respond to the emergency situation and the queried and downloaded information may be wirelessly communicated to the mobile emergency device 400 as it becomes available.

At block 460, the mobile emergency device 400 may, upon entering communication range of the control system 100, establish ad-hoc communications with one or more of the emergency devices/automation components 116*a* to 116*i* deployed within the structure. For example, the emergency devices/automation components 116*a* to 116*i* may provide information directly to the mobile emergency device 400. In an embodiment, the emergency device/automation component 116*a* may wirelessly provide: (1) a temperature indication 414; (2) an air quality indication 416; (3) an oxygen level indication 418 (see FIGS. 4 and 5); the structure map 420; (5) hazardous material locations; and (6) information and/or comments from a remote supervisor, etc. to the mobile emergency device 400. The mobile emergency device 400 may, in turn, display the provided information on the touch screen 402.

In another embodiment, the emergency device/automation component 116*a* may broadcast or otherwise communicate location information. The location information may identify, for example, the position of the emergency device/automation component 116*a* within the structure and/or within the zone 302 (see FIG. 3). In another embodiment, the mobile emergency device 400 may receive location information from multiple emergency devices/automation components 116*a*, 116*e* and 116*f*, this information may, in turn, be utilized to triangulate the position of the mobile emergency device 400 within the structure and zones 302/304.

In another embodiment, the mobile emergency device 400 may provide position information to, for example, the emergency device/automation component 116*a*. For example, the mobile emergency device 400 may include a GPS transceiver or inertial navigation module that may be utilized to determine its position within the structure, relative to a known location and/or within the control system 100. Moreover, a user may manually enter or provide information to the mobile emergency device 400. Alternatively, the mobile emergency device 400 may report or identify its presence upon receiving location information for one or more of the emergency devices/automation components 116*a* to 116*i*. In this way, position information may be provided to and received from the mobile emergency device 400 thereby allowing first responders to be directed towards an emergency situation or to some other task. Moreover, each of the emergency devices/automation components 116*a* to 116*i* may each provide location information about the other emergency devices/automation components 116*a* to 116*i*. This location information for each of the emergency devices/automation components 116*a* to 116*i* may be, in turn, overlaid, on the structure map 420 to allow the first responder to determine their own position.

In another embodiment, the control system 100 and or the laptop 308 may analyze the position data of the mobile emergency device 400 and the position and status of one or more of the emergency devices/automation components 116*a* to 116*i* to determine the safest, fastest egress routes from within the structure. Moreover, this information could be determined remotely at the laptop 308 and communicated to the control system 100 via the terminal 104. The emergency devices/automation components 116*a* to 116*i* may, in turn, broadcast this information to the mobile communication device 400. Moreover, depending upon the communication bandwidth of the emergency devices/automation components 116*a* to 116*i*, it may be possible to establish a text or voice over internet protocol (VoIP) between the emergency mobile device 400 and the terminal 104 or laptop 308 utilizing the communication infrastructure of the control system 100. Alternatively, it may be possible and/or desirable to establish a text or voice communication method such as voice synthesis or voice recognition by the local device that would provide levels of command, control, location, situation information to the fire fighter 210 and/or the laptop 308.

Figure 5:
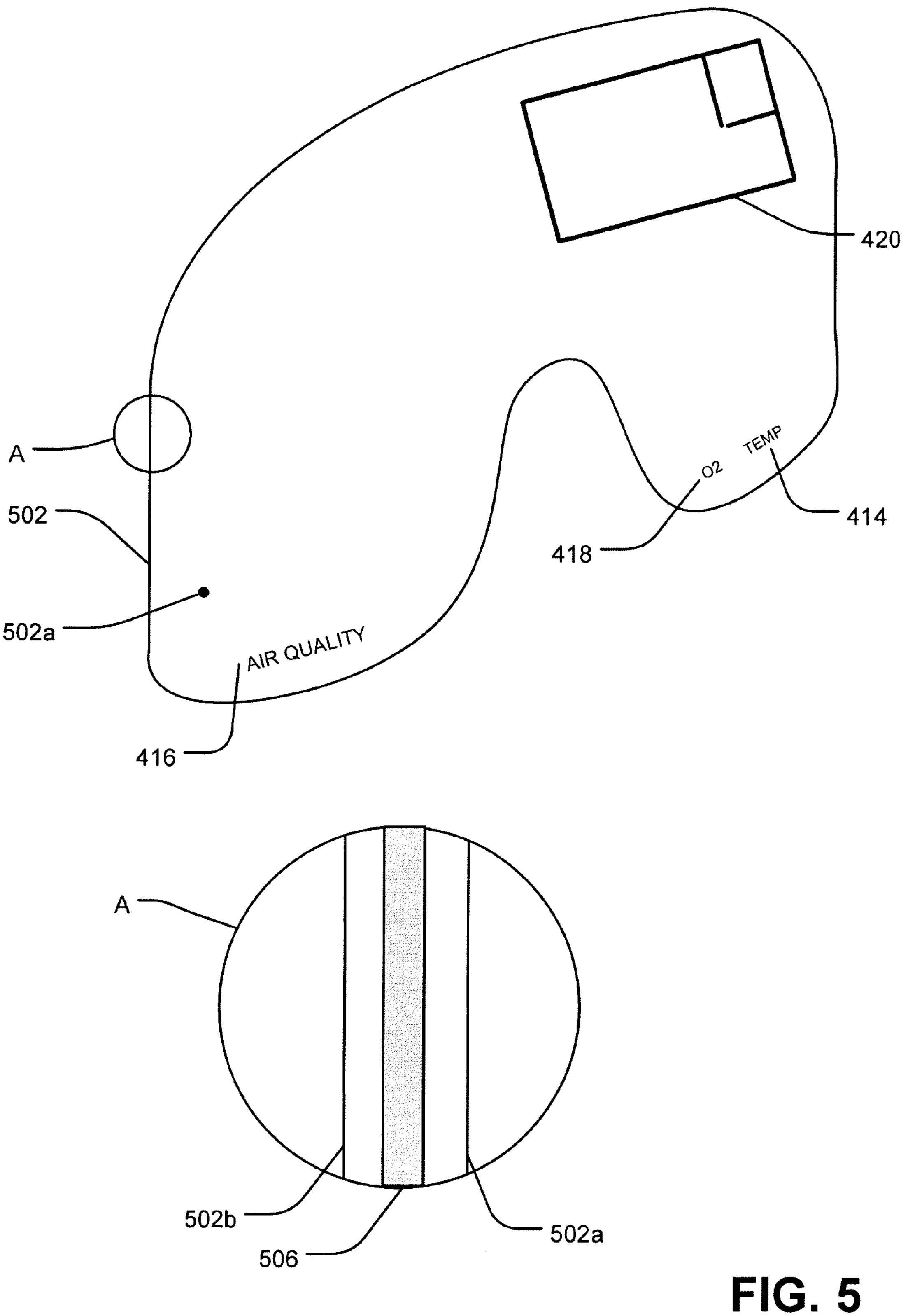
FIG. 5 illustrates a display that may be utilized by emergency personnel.

FIG. 5 illustrates an embodiment of a face shield assembly 500 that may be utilized with a helmet (not shown) worn by emergency personnel during emergency situations such as a structure fire. The face shield assembly 500 may include a visor, a protective goggle and/or a polycarbonate face shield 502 fitted with an image projector 504. The image projector 504 may be arranged to project information down onto an inner surface 502*a* of the face shield 502. Alternatively, the image projector 504 may be, for example, a lipstick or fiber optic projector positioned on the helmet (not shown) to project information onto an inner surface 502*a* of the face shield 502.

In another embodiment, the face shield 502 may be a layered composite shield as shown in callout A. The layered composite includes a liquid crystal matrix 506 supported between the inner surface 502*a* and the outer surface 502*b*. A plurality of electrodes may be deployed about the edges of the face shield 502 to define a Cartesian matrix such that activation of X and Y electrodes causes a change of state at the intersection of the X and Y electrodes. These changes of state may be used to create images and display information in the face shield 502.

The face shield assembly 500 is one type of heads-up display. Other now known or later developed heads-up displays may be used. For example, an ocular device is provided. A prism and mirror are positionable adjacent to or over an eye. The user may see through or around the prism and mirror. The prism and mirror operate with projection of image information for viewing by the user.

In operation, the face shield assembly 500 may be wired or wirelessly connected to, for example, the mobile emergency device 400 or other device with similar capabilities. In another embodiment, the face shield assembly 500 may be configured to communicate by, for example, a short range communications protocol such as Bluetooth. In this configuration, the face shield 502 may replace or augment the touch screen 402 while the mobile emergency device 400 performs the communication and processing functions discussed above.

Alternatively, the memory, processor and computer readable instructions similar and/or identical to the components within the mobile emergency device 400 may be integrated or designed into the structure of the helmet (not shown) and or face shield assembly 500. Regardless of how and where the processing of the information is conducted, information such as, for example, (1) a temperature indication 414; (2) an air quality indication 416; (3) an oxygen level indication 418, (4) a structure map 420; (5) hazardous material locations; and (6) information and/or comments from a remote supervisor, etc., may be projected or displayed on the face shield 502.

Figure 5A:
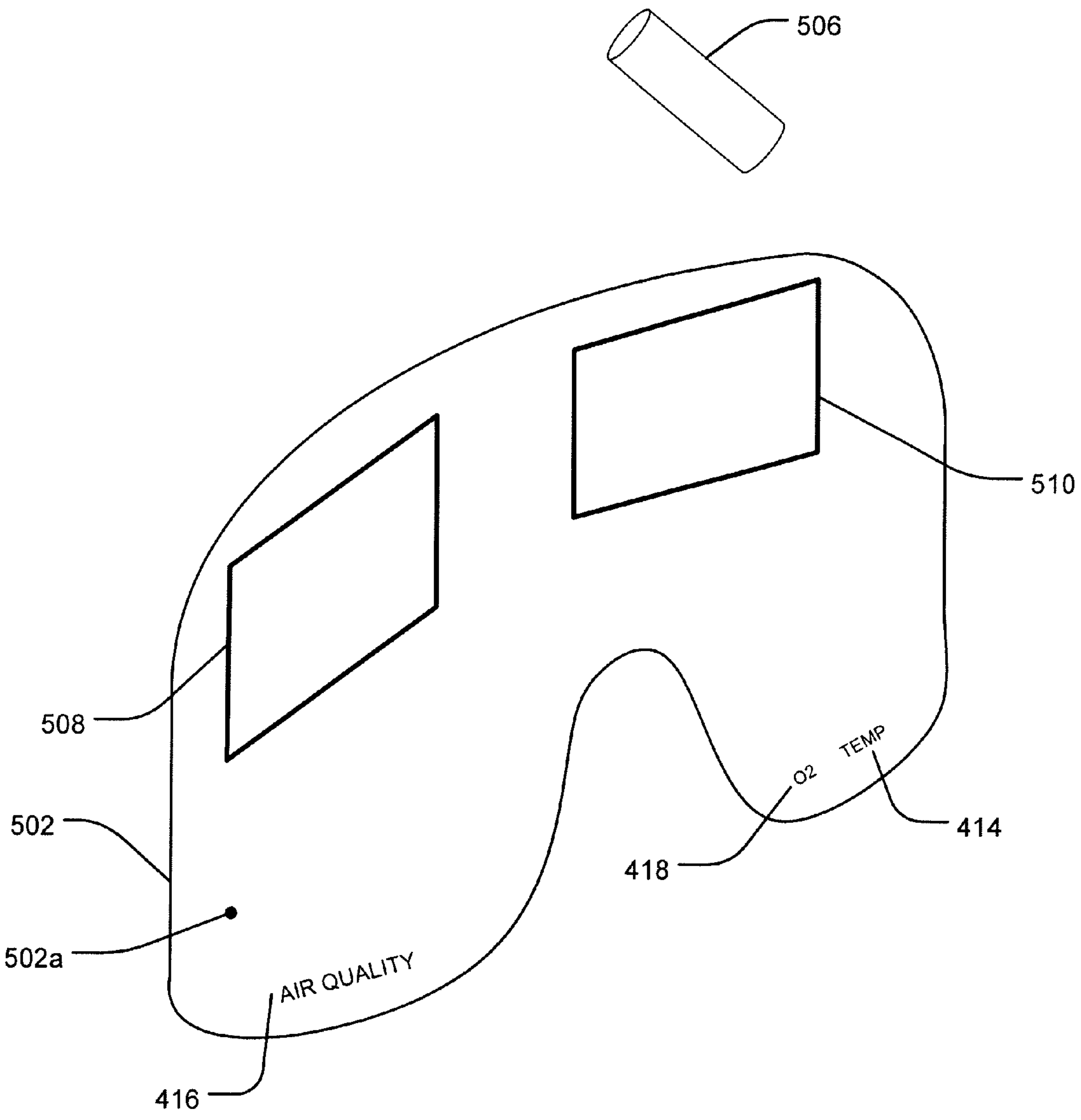
FIG. 5A illustrates another embodiment of a display that may be utilized by emergency personnel.

FIG. 5A illustrated another embodiment that may include a camera 506 such a lipstick camera or a fiber optic camera carried by, for example, the first responder. The camera 506 may be mounted on the helmet (not shown) of the first responder, positioned upon a shoulder harness or otherwise deployed for use during an emergency situation. The camera 506 may be a dual mode configured to operate in a variety of infrared (IR) or visible light spectrums which may aid in locating problems, victims or other items of interest during emergency situations. For example, an IR image 508 and or information gathered by the camera 506 may be displayed on the face shield 502 and/or the touch screen 402 of the mobile emergency device 400. The camera 506 may include or integrate an ultrasonic transceiver to provide addition, computer generated, imaging that may be displayed as an ultrasonic image 510. The camera 506 may capture environmental information such as IR images, visible or low light images, ultrasonic images of the structure and/or emergency situation.

In another embodiment, one or more of the emergency devices/automation components 116*a* to 116*i* may be deployed adjacent to features, equipment and/or controls that may be of interest during an emergency situation. Moreover, the deployed the emergency device/automation component may be configured to broadcast the type of equipment or control as well as location information. For example, the emergency device/automation component 116*b* may be deployed adjacent to a first aid kit, a fuse or power control box, etc. Should a first responder or emergency personnel require the equipment or controls, the signal from the deployed emergency device/automation component 116*b* may be utilized to guide them to its location. In another embodiment, the mobile emergency device 400 can use a transceiver to locate RFID tags deployed in equipment, or as additional locator to provide and/or identify the person within the structure.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. An emergency display device configured for operation within a building automation system, the emergency device comprising:

a wireless communications component for generating an emergency communication in response to a detected emergency condition;

a processor in communication with the wireless communications component and a memory, wherein the processor is configured to execute computer readable instructions stored on the memory to:

evaluate the emergency communication received via the wireless communications component from an emergency display device carried by a first responder to a structure; and generate display data based on the received emergency communication for providing emergency information to the first responder at the structure for responding to the emergency condition: and a heads-up display in communication with the emergency display device for presenting the display data to a user;

wherein the heads-up display includes a heads-up-display projector configured to project the display data on a face shield that covers at least a portion of the face;

wherein the emergency communication includes information selected from the group consisting of: a temperature indication; an air quality indication; an oxygen-level reading; a location indication; structure layout information; fire location information; hazardous material location information and location information related to other personnel.

2. The emergency display device of claim 1, wherein the wireless communication component is a transceiver.

3. The emergency display device of claim 2, wherein the transceiver is selected from the group consisting of: a ZigBee-compliant transceiver; a wireless fidelity (WiFi) radio; a cellular radio, an ultrasonic transceiver; an infrared transceiver; a global positioning sensor transceiver and an RF radio.

4. The emergency display device of claim 1, wherein the emergency communication includes location information representative of a building zone defined within a structure.

5. The emergency display device of claim 1 further comprising: a camera configured to capture environmental information and provide the environmental information to the processor.

6. The emergency display device of claim 5, wherein the camera is a dual mode camera configured to capture infrared environmental information and visible spectrum environmental information.

7. The emergency display device of claim 5, wherein the camera is a dual mode camera configured to capture infrared environmental information and visible spectrum environmental information.

8. The emergency display device of claim 1 further comprising: a camera configured to capture environmental information and provide the environmental information to the processor.

9. An emergency display system comprising:

an emergency device having a wireless communication component, the emergency device configured to:

generate an emergency communication, wherein the emergency communication is related to a structure and the emergency device is carried to the structure by a user; and communicate the emergency communication via the wireless communication component; and a heads-up display device in communication with, at least, the emergency device, the heads-up display device configured to:

process an emergency communication received via the wireless communications component, wherein the emergency communication is provided by an automation component;

generate display data based on the received emergency communication; and present the display data to a user;

wherein the heads-up display includes a heads-up-display projector configured to project the display data on a face shield that covers at least a portion of the face;

wherein the emergency communication includes information selected from the group consisting of: a temperature indication; an air quality indication; an oxygen-level reading; a location indication; structure layout information; fire location information; hazardous material location information and location information related to other personnel.

10. The emergency display system of claim 9, wherein the wireless communication component is selected from the group consisting of: a ZigBee-compliant transceiver; a wireless fidelity (WiFi) radio; a cellular radio, an ultrasonic transceiver; an infrared transceiver; a global positioning sensor transceiver; structure layout information and an RF radio.

11. The emergency display system of claim 9, wherein the emergency communication includes location information representative of a building zone defined within a structure.

12. The emergency display system of claim 9, wherein the heads-up display includes a visor on which the display data is projected.

13. The emergency display system of claim 12, wherein the camera is a dual mode camera configured to capture infrared environmental information and visible spectrum environmental information.

14. The emergency display system of claim 9 further comprising: a camera configured to capture environmental information and provide the environmental information to the processor.

15. An emergency display device configured for operation within a building automation system, the emergency device comprising:

a display projector in communication with a processor and a wireless communications component, wherein the wireless communications component is configured to receive an emergency communication from an emergency display device carried to a structure by a first responder;

a heads-up display for communicating with the emergency display device to display location information contained within the received emergency communication;

wherein the heads-up display includes a heads-up-display projector configured to project the display data on a face shield that covers at least a portion of the face;

wherein the emergency communication includes information selected from the group consisting of: a temperature indication; an air quality indication; an oxygen-level reading; a location indication; structure layout information; fire location information; hazardous material location information and location information related to other personnel.

16. The emergency display device of claim 15, wherein the emergency communication includes location information representative of a building zone defined within a structure.

* * * * *